(12) United States Patent
Koike et al.

(10) Patent No.: US 12,081,786 B2
(45) Date of Patent: Sep. 3, 2024

(54) VR VIDEO ENCODING PARAMETER CALCULATION APPARATUS, VR VIDEO ENCODING PARAMETER CALCULATION METHOD AND PROGRAM

(71) Applicant: Nippon Telegraph and Telephone Corporation, Tokyo (JP)

(72) Inventors: Masanori Koike, Musashino (JP); Yuichiro Urata, Musashino (JP); Kazuhisa Yamagishi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 73 days.

(21) Appl. No.: 17/801,888

(22) PCT Filed: Feb. 25, 2020

(86) PCT No.: PCT/JP2020/007457
§ 371 (c)(1),
(2) Date: Aug. 24, 2022

(87) PCT Pub. No.: WO2021/171362
PCT Pub. Date: Sep. 2, 2021

(65) Prior Publication Data
US 2023/0078062 A1 Mar. 16, 2023

(51) Int. Cl.
*H04N 19/463* (2014.01)
*H04N 19/136* (2014.01)
*H04N 19/154* (2014.01)
*H04N 19/17* (2014.01)

(52) U.S. Cl.
CPC ......... *H04N 19/463* (2014.11); *H04N 19/136* (2014.11); *H04N 19/154* (2014.11); *H04N 19/17* (2014.11)

(58) Field of Classification Search
CPC .. H04N 19/463; H04N 19/136; H04N 19/154; H04N 19/17
See application file for complete search history.

(56) References Cited

FOREIGN PATENT DOCUMENTS

JP 2015065517 4/2015

OTHER PUBLICATIONS

Koike et al., "A Study on Objective Quality Estimation Model for Tile-based VR Video Streaming Services," Technical Report of IEICE, 2019, 118(503): 11 pages (with English Translation).
Sodagar, "The MPEG-DASH Standard for Multimedia Streaming Over the Internet, " IEEE MultiMedia, 2011, 18(4):62-67.
Telecommunications Standardization Sector of ITU, "Parametric bitstream-based quality assessment of progressive download and adaptive audio visual streaming services over reliable transport," Recommendation ITU-T p. 1203, Oct. 2017, 22 pages.
Urata et al., "An applicability of ITU-T Recommendation p. 1203 model to VR video streaming," IEICE Technical Report, 2019, 119(125):79-83, 11 pages (with English Translation).

*Primary Examiner* — On S Mung
(74) *Attorney, Agent, or Firm* — Fish & Richardson P.C.

(57) ABSTRACT

A VR video encoding parameter calculation device includes a quality estimation unit configured to calculate an overall quality estimation value of a VR video for an individual encoding parameter of a plurality of encoding parameters and a VR video parameter extraction unit configured to extract an encoding parameter corresponding to the overall quality estimation value that satisfies given target quality from the plurality of encoding parameters.

9 Claims, 12 Drawing Sheets

ENCODING CONDITION + STREAMING SETTING + TARGET QUALITY

|  | HIGH IMAGE QUALITY TILE | LOW IMAGE QUALITY TILE |
|---|---|---|
| DELAY | 2 SECONDS | |
| RESOLUTION | 3840×1920 | 1920×960 |
| FRAME RATE | 30 fps | 30 fps |
| CODEC | H.264 | H.264 |
| TARGET QUALITY | 4.0 | |
| BIT RATE | NO INPUT | NO INPUT |
| ... | ... | ... |

(b)

PARAMETER SETTING VALUE CANDIDATE GROUP

BIT RATE

| HIGH IMAGE QUALITY TILE | LOW IMAGE QUALITY TILE |
|---|---|
| 20 Mbps | 5 Mbps |
| 19 Mbps | 5 Mbps |
| ... | ... |
| 15 Mbps | 5 Mbps |
| 14 Mbps | 5 Mbps |
| 13 Mbps | 5 Mbps |
| ... | ... |
| 10 Mbps | 5 Mbps |

Fig. 3

INPUT

ENCODING CONDITION + STREAMING SETTING + TARGET QUALITY

| | HIGH IMAGE QUALITY TILE | LOW IMAGE QUALITY TILE |
|---|---|---|
| DELAY | 2 SECONDS ||
| RESOLUTION | 3840x1920 | 1920x960 |
| FRAME RATE | 30 fps | 30 fps |
| CODEC | H.264 | H.264 |
| TARGET QUALITY | 4.0 ||
| BIT RATE | NO INPUT | NO INPUT |
| ⋮ | ⋮ | ⋮ |

+

PARAMETER SETTING VALUE CANDIDATE GROUP

| CANDIDATE | HIGH IMAGE QUALITY TILE | LOW IMAGE QUALITY TILE |
|---|---|---|
| (1) | 20 Mbps | 5 Mbps |
| (2) | 19 Mbps | 5 Mbps |
| | ⋮ | ⋮ |
| (4) | 16 Mbps | 5 Mbps |
| (5) | 15 Mbps | 5 Mbps |
| (6) | 14 Mbps | 5 Mbps |
| (7) | 13 Mbps | 5 Mbps |
| | ⋮ | ⋮ |
| (11) | 10 Mbps | 5 Mbps |

Fig. 4

OVERALL QUALITY TO BE CALCULATED

| CANDIDATE | OVERALL QUALITY |
|---|---|
| (1) | 4.8 |
| (2) | 4.7 |
| | ⋮ |
| (4) | 4.2 |
| (5) | 4.1 |
| (6) | 4.0 |
| (7) | 3.7 |
| | ⋮ |
| (11) | 2.5 |

Fig. 5

OUTPUT

| POST-EXTRACTION ENCODING PARAMETER | | |
|---|---|---|
| | HIGH IMAGE QUALITY TILE | LOW IMAGE QUALITY TILE |
| DELAY | 2 SECONDS | |
| RESOLUTION | 3840x1920 | 1920x960 |
| FRAME RATE | 30 fps | 30 fps |
| CODEC | H.264 | H.264 |
| ESTIMATED QUALITY | 4.1 | |
| BIT RATE | 15 Mbps | 5 Mbps |
| ⋮ | ⋮ | ⋮ |

+

| | HIGH IMAGE QUALITY TILE | LOW IMAGE QUALITY TILE |
|---|---|---|
| DELAY | 2 SECONDS | |
| RESOLUTION | 3840x1920 | 1920x960 |
| FRAME RATE | 30 fps | 30 fps |
| CODEC | H.264 | H.264 |
| ESTIMATED QUALITY | 4.0 | |
| BIT RATE | 14 Mbps | 5 Mbps |
| ⋮ | ⋮ | ⋮ |

Fig. 6

INPUT

| | HIGH IMAGE QUALITY TILE | LOW IMAGE QUALITY TILE |
|---|---|---|
| DELAY | 2 SECONDS | |
| RESOLUTION | 3840x1920 | 1920x960 |
| FRAME RATE | 30 fps | 30 fps |
| CODEC | H.264 | H.264 |
| TARGET QUALITY | 4.0 | |
| QP | NO INPUT | NO INPUT |
| ⋮ | ⋮ | ⋮ |

+

PARAMETER SETTING VALUE CANDIDATE GROUP

| CANDIDATE | HIGH IMAGE QUALITY TILE QP | LOW IMAGE QUALITY TILE QP |
|---|---|---|
| (1) | 10 | 40 |
| (2) | 11 | 40 |
| | ⋮ | ⋮ |
| (13) | 23 | 40 |
| (14) | 24 | 40 |
| (15) | 25 | 40 |
| (16) | 26 | 40 |
| | ⋮ | ⋮ |
| (31) | 40 | 40 |

Fig. 7

OVERALL QUALITY TO BE CALCULATED

| CANDIDATE | OVERALL QUALITY |
|---|---|
| (1) | 4.9 |
| (2) | 4.8 |
| | ⋮ |
| (13) | 4.2 |
| (14) | 4.0 |
| (15) | 3.9 |
| (16) | 3.7 |
| | ⋮ |
| (31) | 1.5 |

Fig. 8

OUTPUT

| POST-EXTRACTION ENCODING PARAMETER ||| 
|---|---|---|
| | HIGH IMAGE QUALITY TILE | LOW IMAGE QUALITY TILE |
| DELAY | 2 SECONDS ||
| RESOLUTION | 3840x1920 | 1920x960 |
| FRAME RATE | 30 fps | 30 fps |
| CODEC | H.264 | H.264 |
| ESTIMATED QUALITY | 4.0 ||
| QP | 24 | 40 |
| ⋮ | ⋮ | ⋮ |

+

| | HIGH IMAGE QUALITY TILE | LOW IMAGE QUALITY TILE |
|---|---|---|
| DELAY | 2 SECONDS ||
| RESOLUTION | 3840x1920 | 1920x960 |
| FRAME RATE | 30 fps | 30 fps |
| CODEC | H.264 | H.264 |
| ESTIMATED QUALITY | 3.9 ||
| QP | 25 | 40 |
| ⋮ | ⋮ | ⋮ |

VR VIDEO ENCODING PARAMETER CALCULATION APPARATUS, VR VIDEO ENCODING PARAMETER CALCULATION METHOD AND PROGRAM

CROSS-REFERENCE TO RELATED APPLICATIONS

This application is a National Stage application under 35 U.S.C. § 371 of International Application No. PCT/JP2020/007457, having an International Filing Date of Feb. 25, 2020. The disclosure of the prior application is considered part of the disclosure of this application, and is incorporated by reference in its entirety into this application.

TECHNICAL FIELD

The present disclosure relates to a technique for calculating encoding parameters in VR video streaming.

BACKGROUND ART

In recent years, with the development of head mounted displays (HMD) and encoding technologies, the opportunities for a user to view a virtual reality (VR) video that allows the user to look around 360 degrees have been increasing. Along with that, VR video streaming services have also been increasing, and the opportunities for a user to view a VR video using an HMD, a smartphone, a stationary type display of the related art, or the like have also been increasing.

When viewing a VR video, a user can change the direction of the line of sight by actions such as turning his/her head or moving his/her body while wearing an HMD and also can change the direction of viewing the video by operating a stationary type display of the related art using a mouse or the like.

In VR video streaming, files encoded at a plurality of bit rates on the server side are prepared using, for example, a streaming scheme called MPEG-DASH disclosed in NPL 1, and a video having an optimum bit rate is streamed according to the bandwidth.

In addition, there are largely two types of VR video encoding and streaming methods. One method is a uniform image quality streaming method in which an entire video is streamed with uniform image quality as in a 2D video of the related art. The other method is a method called tile-based streaming in which a video in the direction of a user's viewing displayed on an HMD or the like is streamed with high image quality and other videos not displayed on the HMD or the like are streamed with low image quality or not streamed, thereby suppressing the bandwidth.

Quality deterioration due to VR video encoding common in both the uniform image quality streaming and the tile-based streaming includes spatial distortion due to blurring, a decrease in definition, and the like, temporal distortion such as deterioration of smoothness or flickering, and deterioration due to spatial-temporal distortion such as noise at edge portions.

In addition, in tile-based VR video streaming, a user views both videos of a tile sent with high image quality and viewed when the direction of the line of sight is not changed (hereinafter referred to as a high image quality tile) and a tile temporarily viewed when the direction of the line of sight is changed (hereinafter referred to as a low image quality tile). When the user changes the direction of viewing, it takes some time to switch a tile in a new direction of viewing from a low image quality tile to a high image quality tile (hereinafter referred to as a switching delay), and the user views a video of low image quality and thus perceives deterioration of video quality. The switching delay can be designed to a certain extent by changing a length of one chunk during encoding, a buffer time during streaming, or the like. However, in a case where the switching delay is long, the user views the low image quality tile for a long time, so that the contribution rate of the low image quality tile to quality experienced by the user is considered to be greater.

In addition, the size of the high image quality tile displayed on the HMD or the like also changes according to the resolutions of the high image quality tile and the low image quality tile. Thus the contribution rate to quality experienced by the user is considered to change according to the resolution. In addition, when a low image quality video is not streamed in tile-based VR video streaming, the user cannot view the video temporarily when changing the direction of viewing and thus perceives deterioration of quality.

As described above, in a streaming scheme such as MPEG-DASH, it is necessary to optimize streaming quality prepared in advance in order to achieve optimum quality control for the user. Because streaming quality changes greatly according to encoding parameters set when video content is encoded, it is important to develop a technique of calculating encoding parameters appropriate for the video content in the uniform image quality streaming and the tile-based streaming. Examples of the encoding parameters include bit rate, resolution, frame rate, and quantization parameters. In addition, in tile-based VR video streaming, it is also important to derive the encoding parameters in consideration of the overall streaming quality felt from streaming in a high image quality region and a low image quality region.

PTL 1 describes a method of deriving encoding parameters such as a bit rate corresponding to the input target quality in order to optimize streaming quality for 2D video streaming of the related art. Specifically, combinations that satisfy the target quality are derived by estimating quality for numerous combinations of encoding parameter values. Meanwhile, the target quality may be any value between 1 and 5, or may be a value between 0 and 100.

As a technique of estimating quality of 2D videos of the related art, for example, a standardized technique is disclosed in NPL 2 in addition to PTL 1 described above.

However, these quality estimation techniques are intended for 2D videos, and quality estimation techniques intended for VR videos have not been established yet. In addition, in tile-based VR video streaming, because the user views both videos of the high image quality tile and the low image quality tile, the image quality of each of the high image quality and low image quality tiles influences the overall quality.

CITATION LIST

Non Patent Literature

NPL 1: I. Sodagar, "The MPEG-DASH Standard for Multimedia Streaming Over the Internet," in IEEE MultiMedia, vol. 18, pp. 62-67, 2011

NPL 2: Parametric bitstream-based quality assessment of progressive download and adaptive audiovisual streaming services over reliable transport, Recommendation ITU-T P.1203, 2017

PATENT LITERATURE

PTL 1: JP 2015-65517 A

SUMMARY OF THE INVENTION

Technical Problem

As described above, the quality estimation and encoding parameter calculation of 2D videos of the related art in NPL 2, PTL 1, and the like are not intended for uniform image quality VR videos and tile-based VR videos. Particularly, in tile-based VR video streaming, such encoding parameter calculation based on the overall quality of the high image quality tile and the low image quality tile is not possible.

The present disclosure has been contrived in view of the above points, and an object thereof is to provide a technique capable of calculating encoding parameters of a VR video based on target quality in VR video streaming.

Means for Solving the Problem

According to the disclosed technique, there is provided a VR video encoding parameter calculation device including: a quality estimation unit configured to calculate an overall quality estimation value of a VR video for an individual encoding parameter of a plurality of encoding parameters; and a VR video parameter extraction unit configured to extract, from the plurality of encoding parameters, an encoding parameter corresponding to the overall quality estimation value that satisfies given target quality.

Effects of the Invention

According to the disclosed technique, it is possible to provide a technique capable of calculating encoding parameters of a VR video based on target quality in VR video streaming.

BRIEF DESCRIPTION OF DRAWINGS

FIG. 2 is a diagram illustrating an image of input information.

FIG. 3 is a diagram for describing input, calculation information, and output.

FIG. 4 is a diagram for describing input, calculation information, and output.

FIG. 5 is a diagram for describing input, calculation information, and output.

FIG. 6 is a diagram for describing input, calculation information, and output.

FIG. 7 is a diagram for describing input, calculation information, and output.

FIG. 8 is a diagram for describing input, calculation information, and output.

DESCRIPTION OF EMBODIMENTS

Hereinafter, embodiments of the present disclosure will be described with reference to the accompanying drawings. Embodiment to be described below are mere examples, and embodiments to which the present disclosure is applied are not limited to the following embodiments.

In the following embodiments, a VR video encoding parameter calculation device will be described that calculates VR video encoding parameters (such as a bit rate, resolution, a frame rate, and quantization parameters) based on a target value of VR video quality that a user experiences when the user views a VR video that allows the user to look around 360 degrees in a state where the user wears a head mounted display (HMD) or the like and can change the direction of the line of sight by actions such as turning his/her head or moving his/her body, or a state where the user can change the viewing direction by operating a mouse or the like on a stationary type display of the related art.

First Embodiment

Figure 1:
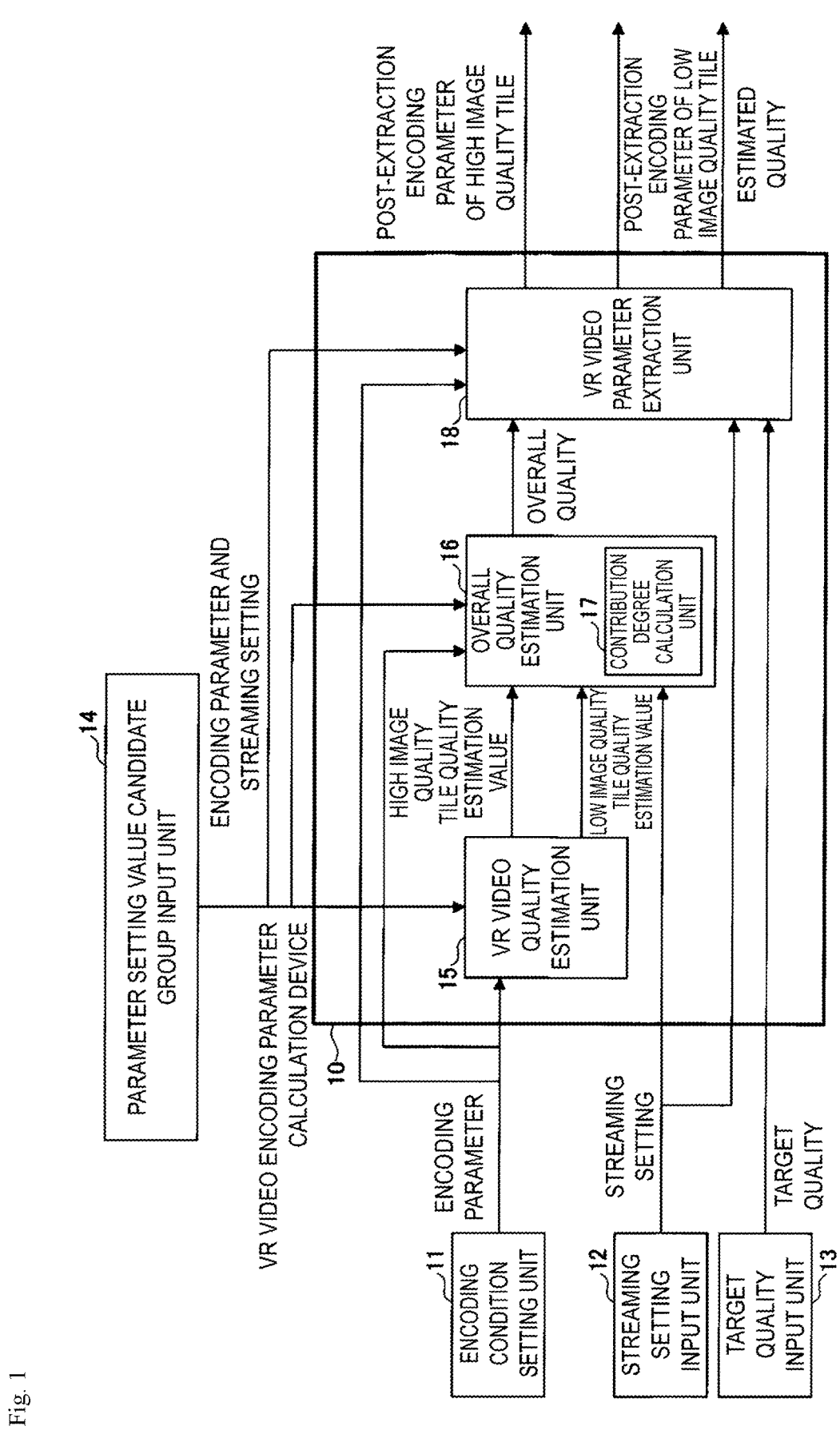
FIG. 1 is a configuration diagram of a VR video encoding parameter calculation device according to a first embodiment of the present disclosure.

Hereinafter, a first embodiment of the present disclosure will be described in detail with reference to the accompanying drawings. FIG. 1 illustrates a configuration of a VR video encoding parameter calculation device 10 according to the first embodiment of the present disclosure.

As illustrated in FIG. 1, the VR video encoding parameter calculation device 10 includes a VR video quality estimation unit 15, an overall quality estimation unit 16 including a contribution degree calculation unit 17, and a VR video parameter extraction unit 18. Meanwhile, the VR video quality estimation unit 15 and the overall quality estimation unit 16 may be collectively referred to as a quality estimation unit. The same applies to a second embodiment.

FIG. 1 also illustrates an encoding condition setting unit 11, a streaming setting input unit 12, a target quality input unit 13, and a parameter setting value candidate group input unit 14. As illustrated in FIG. 1, the encoding condition setting unit 11 sets encoding parameters in the VR video quality estimation unit 15, the overall quality estimation unit 16, and the VR video parameter extraction unit 18.

The streaming setting input unit 12 inputs streaming settings to the overall quality estimation unit 16 and the VR video parameter extraction unit 18. The target quality input unit 13 inputs target quality to the VR video parameter extraction unit 18. The parameter setting value candidate group input unit 14 inputs an encoding parameter candidate group to the VR video quality estimation unit 15, the overall quality estimation unit 16, and the VR video parameter extraction unit 18. Hereinafter, the operation of each unit will be described in more detail.

The encoding condition setting unit 11 inputs settings of video encoding (video encoding settings) required for VR video streaming to the VR video encoding parameter calculation device 10. Here, the video encoding settings indicate, for example, the frame rate, resolution, codec, bit rate, and quantization parameter (hereinafter referred to as QP) of each of a high image quality tile and a low image quality tile of a tile-based VR video. Meanwhile, the high image quality tile and the low image quality tile may be referred to as a high image quality region and a low image quality region, respectively.

The streaming setting input unit 12 inputs streaming settings in VR video streaming to the VR video encoding parameter calculation device 10. Here, the streaming settings indicate switching delay in VR video streaming and the like. The target quality input unit 13 inputs the target video quality of a VR video to be streamed to the VR video encoding parameter calculation device 10.

The parameter setting value candidate group input unit 14 inputs one or more setting value candidates of encoding parameters, which are not input by the encoding condition setting unit 11 and the streaming setting input unit 12, to the VR video encoding parameter calculation device 10.

FIG. 2 is a diagram illustrating an image of input information in the VR video encoding parameter calculation device 10. Values other than bit rates illustrated in FIG. 2(*a*) are input by the encoding condition setting unit 11, the streaming setting input unit 12, and the target quality input unit 13.

In addition, as illustrated in FIG. 2(*b*), the parameter setting value candidate group input unit 14 inputs bit rates that are encoding parameters which are not input by the encoding condition setting unit 11, the streaming setting input unit 12, and the target quality input unit 13.

FIG. 2(*b*) illustrates a case where, as a parameter setting value (bit rate) candidate group, a value of 5 Mbps (fixed) is input for the low image quality tile and a value from 10 to 20 Mbps in increments of 1 Mbps is input for the high image quality tile.

The parameter setting value candidate group input unit 14 may hold parameter setting value candidates in advance in its own database or the like, and the VR video quality estimation unit 15 may refer to candidates of encoding parameters which are not input from the encoding condition setting unit 11, the streaming setting input unit 12, and the target quality input unit 13.

The VR video quality estimation unit 15 calculates the quality estimation value of each of the high image quality tile and the low image quality tile of the VR video based on the encoding parameters which are input from the encoding condition setting unit 11 and the parameter setting value candidate group input unit 14, and outputs quality estimation according to the number of sets of encoding parameters which are input from the parameter setting value candidate group input unit 14.

The overall quality estimation unit 16 calculates and outputs the overall quality of the VR video using the quality of the high image quality tile and the quality of the low image quality tile which are output by the VR video quality estimation unit 15, the encoding parameters which are input from the parameter setting value candidate group input unit 14, and the streaming settings. The contribution degree calculation unit 17 calculates the degree of contribution of each of the quality of the high image quality tile and the quality of the low image quality tile to the overall quality.

The VR video parameter extraction unit 18 calculates the encoding parameters of the high image quality tile and the low image quality tile by extracting encoding parameters having quality close to target quality from among the overall quality which is output from the overall quality estimation unit 16.

The number of sets of encoding parameters of the high image quality tile and the low image quality tile which are output by the VR video parameter extraction unit 18 may be one, or a plurality of sets having quality close to the target quality (for example, a difference from the target quality is within 0.1) or all sets of encoding parameters having quality that satisfies the target quality may be used as output parameters. Meanwhile, in the present specification and claims, in addition to a case where quality is equal to or higher than the target quality, a case where quality is close to the target quality (for example, a difference from the target quality is within 0.1) may also be described as "satisfying the target quality." In addition, in a case where only encoding parameters close to the target quality (for example, a difference from the target quality is within 0.1) are output, a case where quality is close to the target quality may be described as "satisfying the target quality."

Examples of input, calculated overall quality, and output in the VR video encoding parameter calculation device 10 are illustrated in FIGS. 3 to 5.

As illustrated in FIG. 3, this example shows a case where the resolution (3840×1920) of the high image quality tile, the resolution (1920×960) of the low image quality tile, the frame rate (30 fps), the delay in switching from a low image quality tile display state to a high image quality tile display state (2 seconds), the target quality (4.0), and the codec (H.264) are provided from the encoding condition setting unit 11, the streaming setting input unit 12, and the target setting input unit 13, and bit rates satisfying quality close to the target quality are calculated under these encoding conditions and streaming conditions.

In addition, as illustrated in FIG. 3, for the parameter setting value candidate group, the bit rate of the low image quality tile is fixed at 5 Mbps, and the bit rate of the high image quality tile is input in a range from 10 to 20 Mbps in increments of 1 Mbps.

The VR video quality estimation unit 15 and the overall quality estimation unit 16 estimate video quality for each set of bit rates of the parameter setting value candidate group, and the overall quality is output from the overall quality estimation unit 16. As illustrated in FIG. 4, the overall quality is calculated for each of candidates (1) to (11) of the bit rates provided from the parameter setting value candidate group input unit 14.

The VR video parameter extraction unit 18 receives the overall quality, the streaming settings, the encoding parameters, and the target quality as input to extract parameters the overall quality of which is close to the target quality (for example, the absolute difference from the target quality is within 0.1), and outputs the corresponding encoding parameters, streaming settings, and overall quality as post-extraction encoding parameters and estimated quality of the high image quality tile and the low image quality tile.

In the example illustrated in FIG. 5, a candidate (5) (the bit rate of the high image quality tile is 15 Mbps, and the bit rate of the low image quality tile is 5 Mbps) and a candidate (6) (the bit rate of the high image quality tile is 14 Mbps, and the bit rate of the low image quality tile is 5 Mbps) are extracted because the absolute difference between the target quality and the overall quality is within 0.1, and post-extraction encoding parameters corresponding to these candidates are output as illustrated in FIG. 5.

In the examples of FIGS. 3 to 5, the VR video encoding parameter calculation device 10 outputs encoding parameters the overall quality of which is close to the target quality, but it may output all encoding parameters that satisfy the target quality. In that case, encoding parameters corresponding to the candidates (1) to (6) the overall quality of which is equal to or higher than 4.0 are output.

In the above examples, the VR video encoding parameter calculation device 10 outputs the delay, resolution, frame rate, codec, and bit rate as encoding parameters the overall quality of which is close to or which satisfy the target quality, but it may output a quantization parameter (QP) instead of the bit rate. Examples of this case are illustrated in FIGS. 6 to 8.

In the examples of FIGS. 6 to 8, the inputs of the encoding condition setting unit 11, the streaming setting input unit 12, and the target setting input unit 13 are the same as those in the examples described in FIGS. 3 to 5. In the examples of FIGS. 6 to 8, QP is used instead of the bit rate.

In the examples of FIGS. 6 to 8, as the parameter setting value candidate group, the QP of the low image quality tile is fixed at 40, and the QP of the high image quality tile is set in increments of 1 from 10 to 40.

As in the examples of FIGS. 3 to 5, quality is calculated for each QP candidate, a candidate (14) (the QP of the high image quality tile is 24, and the QP of the low image quality tile QP is 40) and a candidate (15) (the QP of the high image quality tile QP is 25, and the QP of the low image quality tile QP is 40) are extracted because the absolute difference between the target quality and the overall quality is within 0.1, and encoding parameters corresponding to these candidates are output as illustrated in FIG. 8.

In the examples of FIGS. 3 to 6 and FIGS. 7 to 9, encoding parameters other than the bit rate and QP are input to the VR video encoding parameter calculation device 10 from the encoding condition setting unit 11 and the streaming setting input unit 12, and the bit rate or QP is input to the device from the parameter setting value candidate group input unit 14. This is an example. The encoding condition setting unit 11 and the streaming setting input unit 12 can freely change whether to input each encoding parameter, and the parameter setting value candidate group input unit 14 inputs insufficient encoding parameters. In addition, the VR video encoding parameter calculation device 10 may omit, from the output, information that is clear from the input, and may also omit, from the output, the post-extraction estimated quality because it clearly satisfies or is close to the target quality. For example, in the examples of FIGS. 3 to 6 and FIGS. 7 to 9, only the post-extraction bit rate or QP may be output.

Method of Estimating Overall Quality Hereinafter, a method of estimating overall quality which is calculated in the VR video quality estimation unit 15 and the overall quality estimation unit 16 will be described in detail.

An overall quality value experienced when a VR video is viewed (video quality value) is defined as VQ. In order to obtain VQ by formulating the quality of the high image quality tile and the quality of the low image quality tile, the VR video quality estimation unit 15 estimates the quality deterioration and quality of each of the high image quality tile and the low image quality tile using a parameter indicating the quality of the high image quality tile, a parameter indicating the quality of the low image quality tile, and a parameter indicating the delay of tile switching.

For example, the VR video quality estimation unit 15 can calculate a quality estimation value $VQ_H$ of the high image quality tile by the following equations using the resolution, frame rate, and bit rate of the high image quality tile.

$$VQ_H = MOS_{qH}$$

$$MOS_{qH} = q_1 + q_2 \cdot \exp(q_3 \cdot quant_H)$$

$$quant_H = a_1 + a_2 \cdot \ln(a_3 + \ln(br_H) + \ln(br_H \cdot bpp_H))$$

$$bpp_H = \frac{br_H}{res_H \cdot fr} \qquad \text{[Math. 1]}$$

In the above equations, $br_H$ indicates the bit rate of the high image quality tile, $res_H$ indicates the resolution of the high image quality tile, fr indicates a frame rate, and $q_1$ to $q_3$ and $a_1$ to $a_3$ are constants determined in advance. As $quant_H$, the quantization parameter $QP_H$ of the high image quality tile may be used instead of being obtained from $br_H$ and $bpp_H$.

Meanwhile, regarding the wording "constants determined in advance" or "coefficients determined in advance" expressed in the present specification, for example, an optimum value may be obtained through experiments, or in a case where a value specified in ITU-T Recommendation P.1203 can be applied, such a value may be used.

The VR video quality estimation unit 15 may calculate the quality estimation value $VQ_H$ of the high image quality tile as follows using $MOS_{qH}$ described above.

$$VQ_H = MOSfromR(100 - D_H)$$

$$D_H = \max(\min(D_{qH} + D_{uH} + D_t, 100), 0)$$

$$D_{uH} = \max(\min(u_1 \cdot \log 10(u_2 \cdot scaleFactor_H - 1) + 1), 100), 0)$$

$$D_{qH} = \max(\min(100 - RfromMOS(MOS_{qH}), 100), 0)$$

$$scaleFactor_H = \max\left(\frac{disRes}{codRes_H}, 1\right) \qquad \text{[Math. 2]}$$

$$D_t = \begin{cases} \max(\min(D_{t1} - D_{t2} - D_{t3}, 100), 0), & fr < 24 \\ 0, & fr \geq 24 \end{cases}$$

$$D_{t1} = \frac{100 \cdot (t_1 - t_2 \cdot fr)}{t_3 + fr}$$

$$D_{t2} = \frac{Dq \cdot (t_1 - t_2 \cdot fr)}{t_3 + fr}$$

$$D_{t3} = \frac{Du \cdot (t_1 - t_2 \cdot fr)}{t_3 + fr}$$

Here, $D_H$ indicates the amount of quality deterioration caused by the high image quality tile. In addition, disRes and $codRes_H$ indicate the resolution of a display and the encoding resolution of the high image quality tile, respectively.

In addition, RfromMOS and MOSfromR indicate functions of converting a user experience quality MOS and a psychological value R. In addition, in the above equations, $q_1$ to $q_3$, $u_1$ to $u_3$, and $t_1$ to $t_3$ are coefficients determined in advance.

In addition, the VR video quality estimation unit 15 may calculate the quality estimation value $VQ_H$ of the high image quality tile as follows.

$$VQ_H = H + \frac{1 - X}{1 + \left(\frac{br_H}{Y}\right)^{v_1}} \qquad \text{[Math. 3]}$$

$$X = \frac{4 \cdot (1 - \exp(-v_3 \cdot fr)) \cdot res_H}{v_2 + res_H} + 1$$

$$Y = \frac{v_4 \cdot res_H + v_6 \cdot \log_{10}(v_7 \cdot fr + 1)}{1 - \exp(-v_5 \cdot res_H)}$$

Here, $v_1$ to $v_7$ are coefficients determined in advance. By using the same X and Y as X and Y used in the above equations, $VQ_H$ may be calculated as follows using the quantization parameter $QP_H$ of the high image quality tile instead of $br_H$.

$$VQ_H = X + \frac{1-X}{1+\left(\frac{QP_H}{Y}\right)^{v_1}}$$ [Math. 4]

Similarly, the VR video quality estimation unit 15 can calculate the quality $VQ_L$ and quality deterioration $D_L$ of the low image quality tile using the parameters of the low image quality tile. Meanwhile, in a case where the quality of the low image quality tile is calculated, coefficients to be used may be the same as or different from those of the high image quality tile.

The overall quality estimation unit 16 estimates the overall quality value VQ of the VR video by calculating the degree of quality contribution ω of each of the high image quality tile and the low image quality tile using the quality of each of the high image quality tile and the low image quality tile and the switching delay which is a time taken to switch from the display state of the low image quality tile to the display state of the high image quality tile.

For example, the contribution degree calculation unit 17 can calculate the degree of quality contribution ω using the following equations.

$$\omega = d_1 \cdot delay^{-d_2} + d_3 \cdot S_L^{-d_4}, \; S_L = \frac{res - res_H}{res}$$ [Math. 5]

Here, delay is the switching delay, $res_H$ is the resolution of the high image quality tile, res is the resolution of the entire video, and $d_1$ to $d_4$ are coefficients determined in advance. In addition, ω is a value indicating the ratio of distributing the quality deterioration of the high image quality tile and the low image quality tile. In addition, ω is obtained using the switching delay and resolution of tiles. Particularly, when the relation of $d_3$ is zero, ω is calculated with the influence of resolution not taken into consideration. In addition, ω may be calculated as follows in the form of a product using the same variables and coefficients. Meanwhile, $S_L$ is equivalent to an area occupied by the low image quality tile (low image quality region) in the entire image. In a case where the low image quality tile is not displayed, $S_L$ is set to zero.

$$\omega = d_1 \cdot delay^{-d_2} \cdot d_3 \cdot S_L^{-d_4}$$ [Math. 6]

The overall quality estimation unit 16 can calculate the overall quality VQ as follows using the degree of quality contribution ω, the quality $VQ_H$ of the high image quality tile, and the quality $VQ_L$ of the low image quality tile.

$$VQ = \omega \cdot VQ_H + (1-\omega) \cdot VQ_L$$

In addition, the overall quality estimation unit 16 may calculate VQ using the following equation.

$$VQ = \frac{VQ_H - VQ_L}{1 + (d_5 \cdot delay + d_6)^{d_7} \cdot (d_8 \cdot S_{ratio} + d_9)^{d_{10}}} + VQ_L$$ [Math. 7]

In the above, the overall quality is calculated using the quality $VQ_H$ of the high image quality tile and the quality $VQ_L$ of the low image quality tile. The overall quality estimation unit 16 may use the quality deterioration $D_H$ of the high image quality tile and the quality deterioration $D_L$ of the low image quality tile to calculate VQ using the following equations.

$$D_{HL} = \omega \cdot D_H + (1-\omega) \cdot D_L$$

$$VQ = MOSfromR(100 - \max(\min(D_{HL}, 100), 0))$$

In addition, the overall quality estimation unit 16 may calculate $D_{HL}$ as follows.

$$D_{HL} = \frac{D_H - D_L}{1 + (d_5 \cdot delay + d_6)^{d_7} \cdot (d_8 \cdot S_L + d_9)^{d_{10}}} + D_L$$ [Math. 8]

In the above equation, $d_1$ to $d_{10}$ are coefficients determined in advance.

In the above example, videos of both the high image quality tile and the low image quality tile are streamed as the VR video. In a case where the low image quality tile is not streamed, all post-extraction encoding parameters of the low image quality tile in the VR video may be output as zero or may not be output. In this case, in a case the high image quality tile does not cover the VR video by 360 degrees, there is a possibility that the video is not displayed due to the movement of the line of sight.

In this case, the contribution degree calculation unit 17 may use the same equation as above to calculate the degree of quality contribution ω, or may calculate the degree of quality contribution ω as follows, for example, by adding a coefficient $d_5$ in consideration of the influence of tiles not being streamed.

$$\omega = \max(d_1 \cdot delay^{-d_2} \cdot d_3 \cdot S_L^{-d_4} - d_5, 0)$$ [Math. 9]

In addition, when the above low image quality tile is not streamed and the high image quality tile covers the VR video by 360 degrees, the quality does not change due to the movement of the line of sight, which corresponds to uniform image quality VR video streaming. In this case, the switching delay due to the streaming settings may be set to zero, or may be output. In this case, the encoding parameters can be calculated by setting the degree of quality contribution ω to 1 or simply making VQ equal to $VQ_H$.

The coefficients used in the above equations may be fixed coefficients determined in advance or coefficients that changes according to codec, profile settings, and the like.

In addition, the equations used in the present specification are mere examples, and the quality may be estimated using equations other than those used in the present specification.

Figure 9:
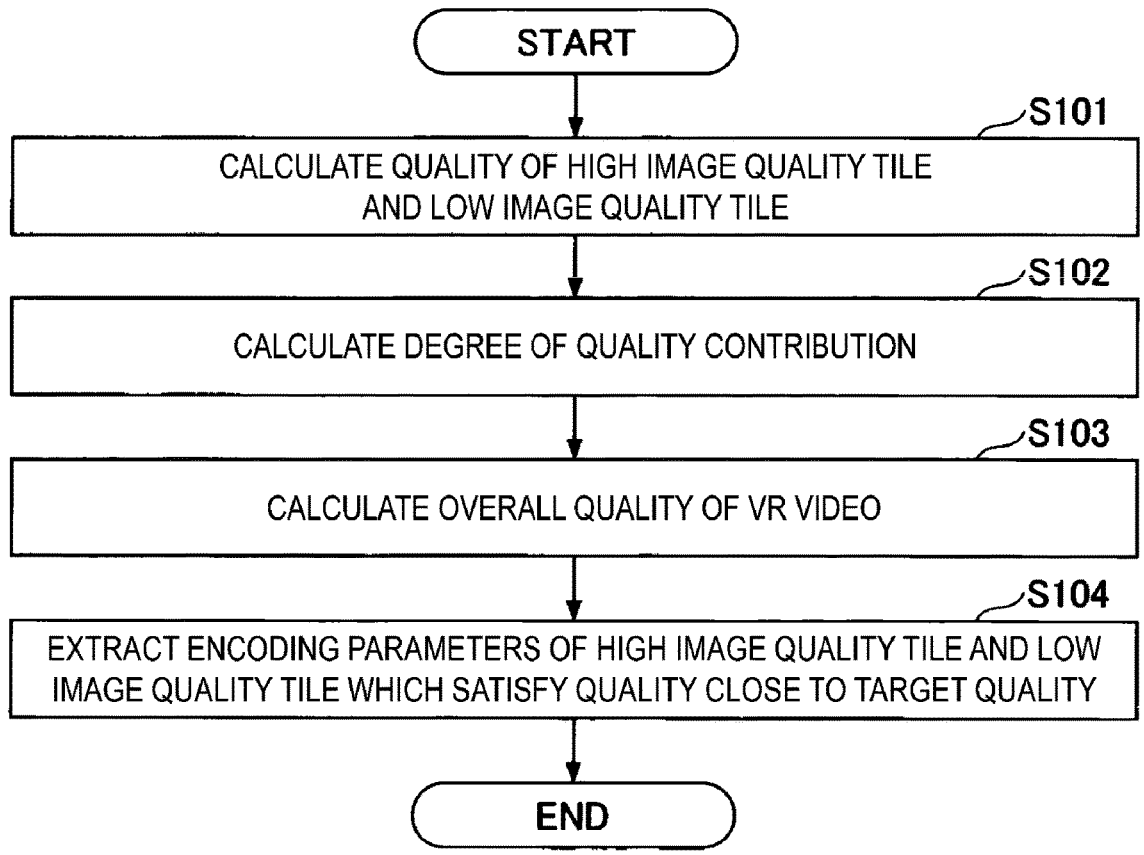
FIG. 9 is a flowchart illustrating a processing procedure of the VR video encoding parameter calculation device according to the first embodiment.

Processing Procedure Hereinafter, a processing procedure executed by the VR video encoding parameter calculation device 10 will be described. FIG. 9 is a flowchart of a VR video encoding parameter calculation method according to the first embodiment.

In S101, the VR video quality estimation unit 15 calculates the quality of the high image quality tile and the low image quality tile based on the input encoding parameters, and outputs the calculated quality of the high image quality tile and the low image quality tile to the overall quality estimation unit 16.

In S102, the contribution degree calculation unit 17 calculates the degree of quality contribution based on the input streaming settings.

In S103, the overall quality estimation unit 16 calculates the overall quality of the VR video based on the input encoding parameters, the quality of the high image quality tile and the low image quality tile, and the calculated degree of quality contribution. The calculated overall quality is output to the VR video parameter extraction unit 18.

In S104, the VR video parameter extraction unit 18 extracts and outputs the encoding parameters of the high image quality tile and the low image quality tile which satisfy quality close to the target quality based on the input target quality and overall quality.

Second Embodiment

Next, a second embodiment of the present disclosure will be described. In the second embodiment, instead of inputting video encoding setting information from the encoding condition setting unit 11, a VR video to be streamed is input from a VR video input unit 20 to a VR video encoding parameter calculation device 10.

Figure 10:
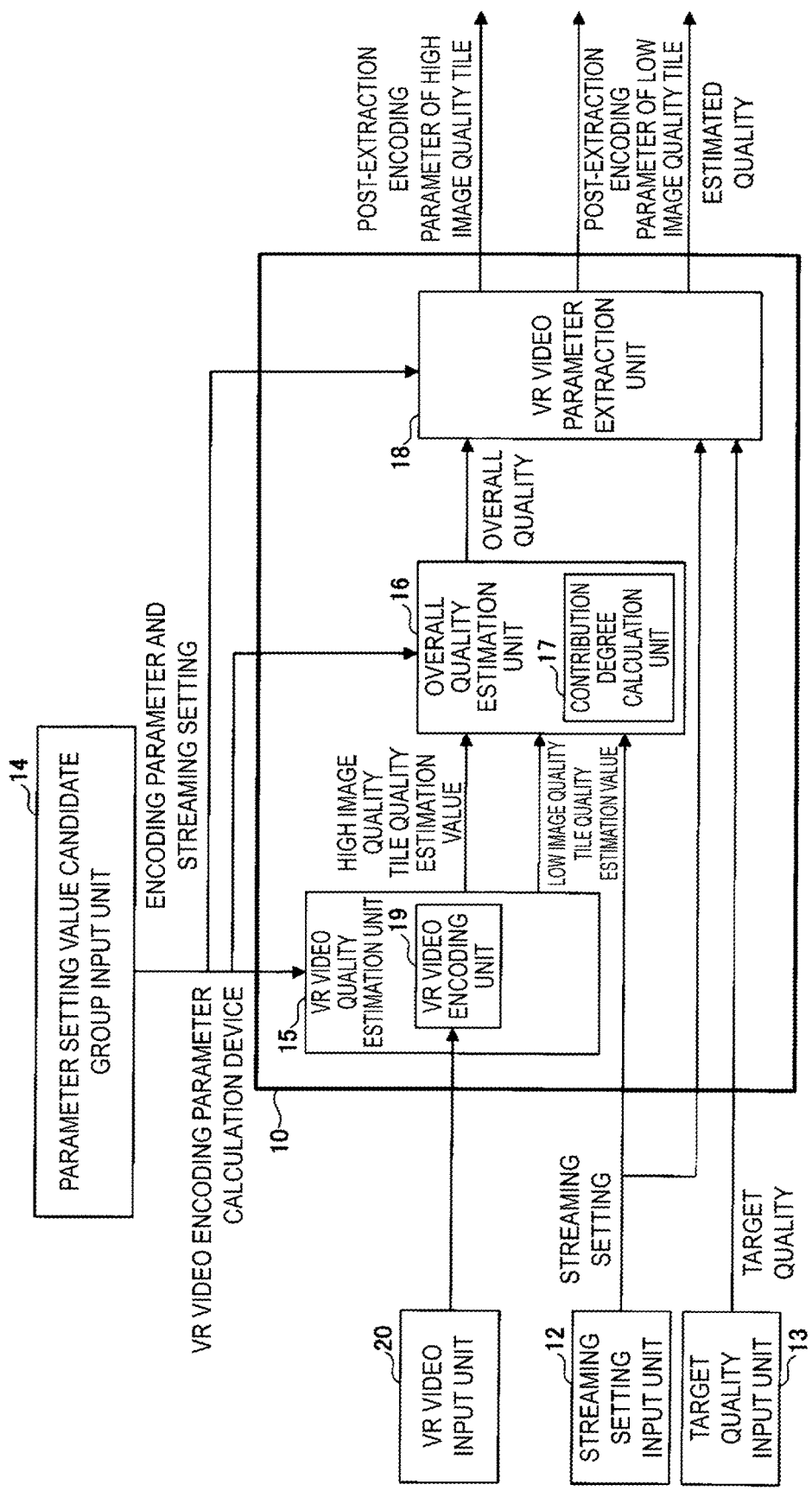
FIG. 10 is a configuration diagram of a VR video encoding parameter calculation device according to a second embodiment.

FIG. 10 is a configuration diagram of the VR video encoding parameter calculation device 10 according to the second embodiment of the present disclosure. Unlike the first embodiment, the VR video to be streamed is input to the VR video encoding parameter calculation device 10 instead of the encoding parameters of the VR video.

The input VR video is encoded in a plurality of (for example, three or more) quality stages in a VR video encoding unit 19 within the VR video quality estimation unit 15. The VR video encoding unit 19 extracts the quantization parameter and the bit rate in each of the plurality of stages of encoding.

In the equation for calculating $quant_H$ of the first embodiment, $a_1$ to $a_3$ are coefficients determined in advance. However, in the second embodiment, the VR video encoding unit 19 uses the quantization parameter $QP_H$ and bit rate $br_H$ of the video extracted by the plurality of stages of encoding, performs optimization of the coefficients $a_1$ to $a_3$ in the following equation on the input VR video so that $quant_H$ approaches $QP_H$ in the above encoding using a least squares method, and determines $a_1$ to $a_3$.

$$quant_H = a_1 + a_2 \cdot \ln(a_3 + \ln(br_H) + \ln(br_H \cdot bpp_H))$$

In addition, the VR video encoding unit 19 may perform optimization using the following equation.

$$quant_H = a_1 * \log\left(\frac{b_{yH}}{res_H}\right) + a_2 \quad \text{[Math. 10]}$$

Even in a case where the low image quality tile is not streamed and the high image quality tile does not cover the VR video by 360 degrees or in a case of uniform VR video streaming in which the high image quality tile covers the VR video by 360 degrees, the coefficients $a_1$ to $a_3$ can be optimized by the same calculation as described above.

The coefficients of the equation for each video can be determined by the above calculation. Thus, it is possible to consider features such as ease of encoding for each content in the above calculation, and to calculate the overall quality based on the features of content.

The quality estimation in the VR video quality estimation unit 15 other than the above can be performed by the same calculation as in the first embodiment.

In addition, the overall quality estimation unit 16, the contribution degree calculation unit 17, and the VR video parameter extraction unit 18 perform the same processing as that in the first embodiment and thus the description thereof will be omitted.

Figure 11:
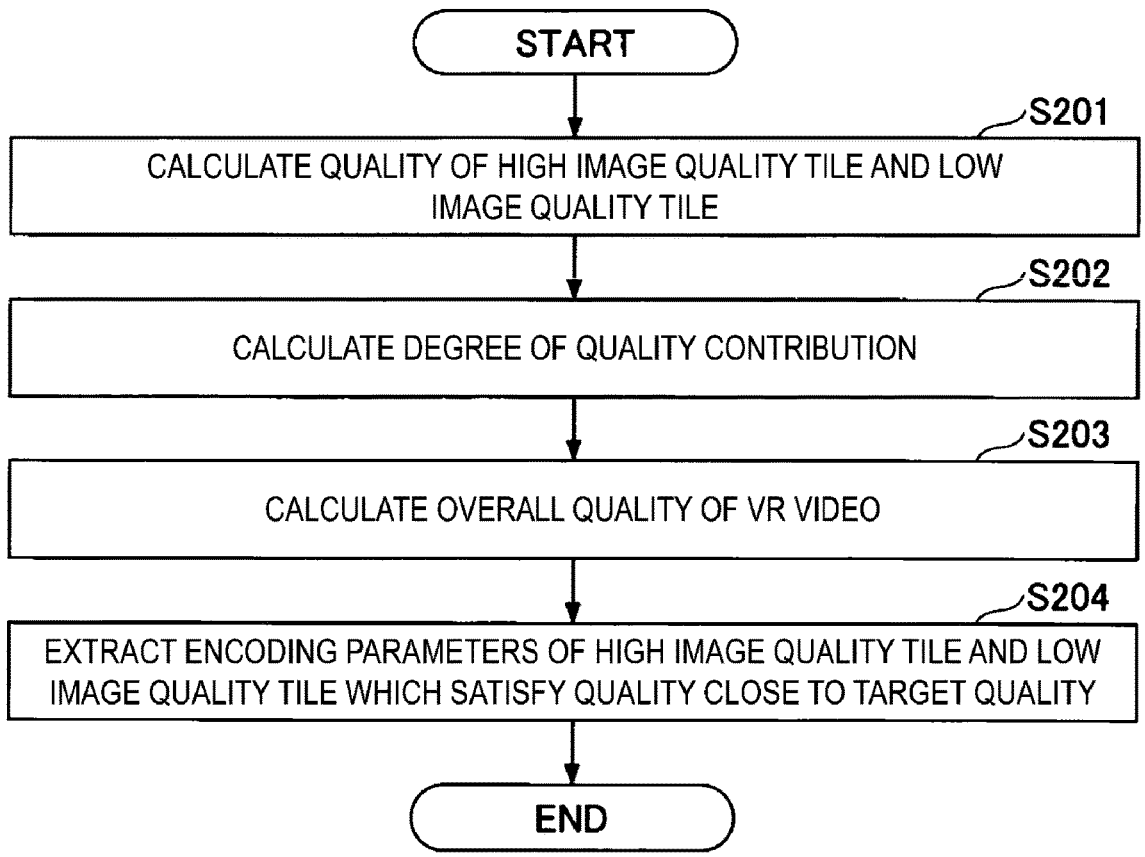
FIG. 11 is a flowchart illustrating a processing procedure of the VR video encoding parameter calculation device according to the second embodiment.

Hereinafter, a processing procedure executed by the VR video encoding parameter calculation device 10 according to the second embodiment of the present disclosure will be described. FIG. 11 is a flowchart of a VR video encoding parameter calculation method according to the second embodiment of the present disclosure.

In S201, the VR video quality estimation unit 15 determines the coefficients as described above based on the input encoding parameters and the VR video, and calculates the quality of the high image quality tile and the low image quality tile. The VR video quality estimation unit 15 outputs the calculated quality of the high image quality tile and the low image quality tile to the overall quality estimation unit 16.

In S202, the contribution degree calculation unit 17 calculates the degree of quality contribution based on the input streaming settings.

In S203, the overall quality estimation unit 16 calculates the overall quality of the VR video based on the input encoding parameters, the quality of the high image quality tile and the low image quality tile, and the calculated degree of quality contribution. The calculated overall quality is output to the VR video parameter extraction unit 18.

In S204, the VR video parameter extraction unit 18 extracts the encoding parameters of the high image quality tile and the low image quality tile which satisfy quality close to the target quality based on the input target quality and overall quality.

Hardware Configuration Example

The VR video encoding parameter calculation device 10 may be achieved by hardware using, for example, a logic circuit that implements the function of each unit illustrated in FIGS. 1 and 10, or may be achieved by causing a general-purpose computer to execute a program describing process details described in the first and second embodiments. Meanwhile, this "computer" may be a virtual machine. In a case where a virtual machine is used, "hardware" described here is virtual hardware.

In a case where a computer is used, the VR video encoding parameter calculation device 10 can be achieved by executing a program corresponding to processing executed by the VR video encoding parameter calculation device 10 using hardware resources such as a CPU and a memory built into the computer. The above program can be stored or distributed with the program recorded on a computer readable recording medium (such as a portable memory). In addition, the above program can also be provided through a network such as the Internet or e-mail.

Figure 12:
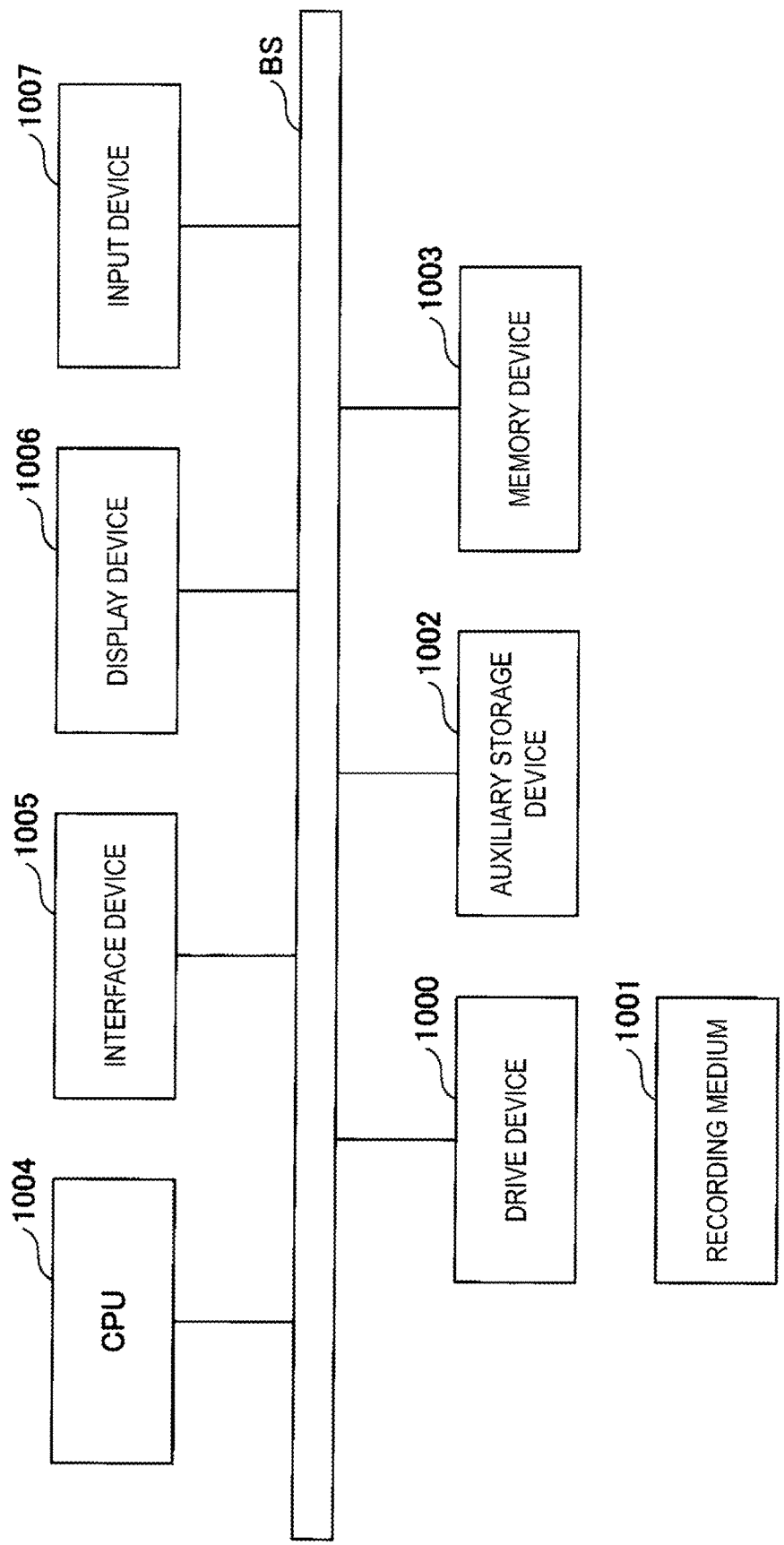
FIG. 12 is a diagram illustrating a hardware configuration example of the VR video encoding parameter calculation device.

FIG. 2 is a diagram illustrating a hardware configuration example of the above computer. The computer of FIG. 12 includes a drive device 1000, an auxiliary storage device 1002, a memory device 1003, a CPU 1004, an interface device 1005, a display device 1006, an input device 1007, and the like which are connected to each other through a bus B.

A program for achieving processing in the computer is provided by a recording medium 1001 such as a CD-ROM or a memory card. When the recording medium 1001 having a program stored therein is set in the drive device 1000, the program is installed from the recording medium 1001 through the drive device 1000 to the auxiliary storage device 1002. However, the program does not necessarily have to be installed from the recording medium 1001, and may be downloaded from another computer through a network. The auxiliary storage device 1002 stores the installed program, and stores necessary files, data, and the like.

In response to an activation instruction of a program, the memory device 1003 reads out the program from the auxiliary storage device 1002 and stores the program. The CPU 1004 implements a function relevant to the VR video encoding parameter calculation device 10 in accordance with the program stored in the memory device 1003. The interface device 1005 is used as an interface for connection to a network. The display device 1006 displays a graphical user interface (GUI) or the like based on the program. The input device 1007 includes a keyboard, a mouse, a button, a touch panel, or the like, and is used for inputting various operation instructions.

Effects of Embodiments

As described above, according to the present embodiments, the overall quality of a VR video is derived using, as input, the VR video or encoding settings, streaming settings, and the target quality of the VR video, and thus it is possible to calculate encoding parameters (such as bit rate, resolution, frame rate, switching delay, and quantization parameter) of a tile-based VR video that are optimum for the target quality of the VR video.

Conclusion of Embodiments

The present specification describes a VR video encoding parameter calculation device, a VR video encoding parameter calculation method, a program which are described in at least the following clauses.

[Clause 1]
A VR video encoding parameter calculation device including:
a quality estimation unit configured to calculate an overall quality estimation value of a VR video for an individual encoding parameter of a plurality of encoding parameters; and
a VR video parameter extraction unit configured to extract, from the plurality of encoding parameters, an encoding parameter corresponding to the overall quality estimation value that satisfies given target quality.

[Clause 2]
The VR video encoding parameter calculation device according to Clause 1, wherein the quality estimation unit calculates the overall quality estimation value based on video encoding setting information or the VR video.

[Clause 3]
The VR video encoding parameter calculation device according to Clause 1 or 2, wherein the quality estimation unit includes:
a VR video quality estimation unit configured to calculate a quality estimation value of a high image quality region in the VR video and a quality estimation value of a low image quality region in the VR video; and
an overall quality estimation unit configured to calculate the overall quality estimation value based on the quality estimation value of the high image quality region and the quality estimation value of the low image quality region.

[Clause 4]
The VR video encoding parameter calculation device according to Clause 3, wherein the overall quality estimation unit
calculates a degree of contribution of quality of the high image quality region and quality of the low image quality region to overall quality based on at least any one of a parameter related to time for switching from a low image quality region display state to a high image quality region display state or information on an area occupied by the low image quality region, and calculates the overall quality estimation value based on the degree of contribution, the quality estimation value of the high image quality region, and the quality estimation value of the low image quality region.

[Clause 5]
A VR video encoding parameter calculation method executed by a VR video encoding parameter calculation device, the method including:
calculating an overall quality estimation value of a VR video for an individual encoding parameter of a plurality of encoding parameters; and extracting, from the plurality of encoding parameters, an encoding parameter corresponding to the overall quality estimation value that satisfies given target quality.

[Clause 6]
A program for causing a computer to operate as each unit of the VR video encoding parameter calculation device according to any one of Clauses 1 to 4.

Although the present embodiments have been described above, the present disclosure is not limited to such specific embodiments, and can be modified and changed variously without departing from the scope of the present disclosure described in the appended claims.

REFERENCE SIGNS LIST

10 VR video encoding parameter calculation device
11 Encoding condition setting unit
12 Streaming setting input unit
13 Target quality input unit
14 Parameter setting value candidate group input unit
15 VR video quality estimation unit
16 Overall quality estimation unit
17 Contribution degree calculation unit
18 VR video parameter extraction unit
19 VR video encoding unit
20 VR video input unit
1000 Drive device
1001 Recording medium
1002 Auxiliary storage device
1003 Memory device
1004 CPU
1005 Interface device
1006 Display device
1007 Input device

The invention claimed is:

1. A Virtual Reality (VR) video encoding parameter calculation device comprising one or more processors configured to perform operations comprising:
calculating an overall quality estimation value of a VR video for each encoding parameter included in a plurality of encoding parameters, wherein calculating the overall quality estimation value of the VR video for an encoding parameter comprises:
calculating (i) a quality estimation value of a high image quality region in the VR video and (ii) a quality estimation value of a low image quality region in the VR video,
calculating a degree of contribution of quality of the high image quality region and quality of the low image quality region to the overall quality estimation value, and
calculating the overall quality estimation value based on the degree of contribution, the quality estimation value of the high image quality region, and the quality estimation value of the low image quality region; and
extracting, from the plurality of encoding parameters, an encoding parameter corresponding to the overall quality estimation value that satisfies given target quality.

2. The VR video encoding parameter calculation device according to claim 1, wherein the operations comprise:
calculating the overall quality estimation value based on video encoding setting information or the VR video.

3. The VR video encoding parameter calculation device according to claim 1, wherein the operations comprise:
calculating the degree of contribution of quality of the high image quality region and quality of the low image quality region to overall quality based on at least any one of a parameter related to time for switching from a low image quality region display state to a high image quality region display state or information on an area occupied by the low image quality region.

4. A Virtual Reality (VR) video encoding parameter calculation method executed by a VR video encoding parameter calculation device, the method comprising:
calculating an overall quality estimation value of a VR video for each encoding parameter included in a plurality of encoding parameters, wherein calculating the overall quality estimation value of the VR video for an encoding parameter comprises:
calculating (i) a quality estimation value of a high image quality region in the VR video and (ii) a quality estimation value of a low image quality region in the VR video,
calculating a degree of contribution of quality of the high image quality region and quality of the low image quality region to the overall quality estimation value, and
calculating the overall quality estimation value based on the degree of contribution, the quality estimation value of the high image quality region, and the quality estimation value of the low image quality region; and
extracting, from the plurality of encoding parameters, an encoding parameter corresponding to the overall quality estimation value that satisfies given target quality.

5. A non-transitory computer readable medium storing one or more instructions causing a computer to operate as a Virtual Reality (VR) video encoding parameter calculation device to execute:
calculating an overall quality estimation value of a VR video for each encoding parameter included in a plurality of encoding parameters, wherein calculating the overall quality estimation value of the VR video for an encoding parameter comprises:
calculating (i) a quality estimation value of a high image quality region in the VR video and (ii) a quality estimation value of a low image quality region in the VR video,
calculating a degree of contribution of quality of the high image quality region and quality of the low image quality region to the overall quality estimation value, and
calculating the overall quality estimation value based on the degree of contribution, the quality estimation value of the high image quality region, and the quality estimation value of the low image quality region; and
extracting, from the plurality of encoding parameters, an encoding parameter corresponding to the overall quality estimation value that satisfies given target quality.

6. The VR video encoding parameter calculation method according to claim 4, comprising:
calculating the overall quality estimation value based on video encoding setting information or the VR video.

7. The VR video encoding parameter calculation method according to claim 4, comprising:
calculating the degree of contribution of quality of the high image quality region and quality of the low image quality region to overall quality based on at least any one of a parameter related to time for switching from a low image quality region display state to a high image quality region display state or information on an area occupied by the low image quality region.

8. The non-transitory computer readable medium according to claim 5, wherein the one or more instructions cause the computer to execute:
calculating the overall quality estimation value based on video encoding setting information or the VR video.

9. The non-transitory computer readable medium according to claim 5, wherein the one or more instructions cause the computer to execute:
calculating the degree of contribution of quality of the high image quality region and quality of the low image quality region to overall quality based on at least any one of a parameter related to time for switching from a low image quality region display state to a high image quality region display state or information on an area occupied by the low image quality region.

* * * * *